US006995546B2

(12) United States Patent
Fujikawa

(10) Patent No.: US 6,995,546 B2
(45) Date of Patent: Feb. 7, 2006

(54) ALTERNATING CURRENT GENERATOR

(75) Inventor: Takayuki Fujikawa, Hiroshima (JP)

(73) Assignee: Shindaiwa Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 10/834,058

(22) Filed: Apr. 29, 2004

(65) Prior Publication Data

US 2005/0242676 A1 Nov. 3, 2005

(51) Int. Cl.
*H02K 19/34* (2006.01)
*H02P 9/00* (2006.01)

(52) U.S. Cl. .......................... 322/93; 322/90; 310/200

(58) Field of Classification Search ............ 322/24–25, 322/89–90, 93; 310/180, 184, 185–187, 310/200

See application file for complete search history.

(56) References Cited

U.S. PATENT DOCUMENTS 4,163,187 A * 7/1979 Thomas ....................... 322/29
4,233,555 A * 11/1980 Roche ......................... 322/25

FOREIGN PATENT DOCUMENTS

| | | |
|---|---|---|
| JP | 63-087157 | 4/1988 |
| JP | 01-295649 | * 11/1989 |
| JP | 08-294258 | * 11/1996 |

* cited by examiner

*Primary Examiner*—Burton Mullins
(74) *Attorney, Agent, or Firm*—Squire, Sanders & Dempsey

(57) ABSTRACT

An alternating current generator of the invention has three armature windings, which are wound from a winding start end connected to a neutral point to winding finish ends, and a stator that is connected to the neutral point in Y-connection at a phase difference of 120 degrees, respectively, and configures a three-phase power source, wherein the generator comprises two taps provided at predetermined positions from the winding start end to the winding finish ends of two armature windings out of the three armature windings, and wherein one terminals of the two armature windings are connected to relevant ones of the two taps and the other terminals of the two armature windings are made single-phase output terminals.

4 Claims, 11 Drawing Sheets

ALTERNATING CURRENT GENERATOR

BACKGROUND OF THE INVENTION

1. Field of the Invention

The present invention relates to an alternating current generator, and in particular, to a power source for the alternating current generator.

2. Description of the Related Art

A number of alternating current generators that combine single-phases of 100 V and 200 V for use in construction sites, various event sites, and the like are needed. In order to respond to such a requirement, a conventional example of an electric generation apparatus, for example, as shown in FIGS. 10 to 12 is disclosed in Japanese Patent Laid-Open Publication No. Sho 63-87157.

That is, in FIG. 10 the conventional example bisects, for example, an armature winding W into W1 and W2 out of a three-phase stator that consists of armature windings U, V, and W connected to a neutral point O at a phase difference of 120 degrees (electric angle), respectively, then connects the armature windings W1 and W2 in series, and in addition, is equipped with a configuration having a connection change device (not shown) for connecting the armature winding W1 to the neutral point O while making only the winding W1 a reverse phase (shown in broken lines). When the armature windings W1 and W2 are connected in series, the conventional example can be used as a three-phase power source by change operation of the connection change device, and, as shown in voltage vectors of FIG. 11, a three-phase alternating current of 200 V each is output from terminals L1, L2, and L3.

On the other hand, when only the armature winding W1 is connected to the neutral point O while being made the reverse phase by the change operation of the connection change device (not shown), the conventional example can be used as a single-phase three-wire power source as shown in electric vectors of FIG. 12. A single-phase alternating current of 100 V is output from between terminals L1 and N, and between terminals L2 and N; a single-phase alternating current of 200 V is output from between terminals L1 and L2. In the meantime, although as shown in FIG. 10, grounding wires Le and Le', and a neutral wire having the neutral terminal N are respectively connected to the neutral point O, and the grounding wires Le and Le' are connected to the ground, the grounding wire Le is separated at the same time as a change is performed to the single-phase three-wire power source, and the grounding wire Le' is connected to the neutral terminal N, thereby the neutral terminal N is grounded to the ground through the grounding wire Le'.

However, there are problems in the conventional example as follows:

(1) The conventional connection change device needs a changeover switch having a contact capacity that can tolerate an output electric power amount. As a result, costs become high, and the electric wiring becomes complex.

(2) When the single-phase three-wire power source is configured in accordance with the conventional example, a voltage of an armature winding that is made the reverse phase appears in the neutral wire terminal N of the single-phase three-wire power source, a neutral terminal. As a result, the neutral terminal loses its property of being a neutral point such that an electric potential thereof is the same as that of the ground. Consequently, although a connection of the grounding wire Le is changed from the neutral point O to the terminal N, this accelerates the problem of item (1).

(3) In the conventional example, alternating current electric powers of the three-phase power source and the single-phase three-wire power source cannot be simultaneously output, and a utilization factor of the alternating current generator also becomes low.

(4) Because the conventional example provides a configuration of separating an armature winding of the three-phase power source into two, thereby performing a change operation, and thus the single-phase three-wire power source is made, a winding number of the armature winding of the single-phase three-wire power source depends on that of the three-phase power source. As a result, an output voltage from the three-phase power source to the single-phase three-wire power source cannot be freely set, and in particular, this makes it difficult to handle overseas situations where voltage specifications are various.

Consequently, it is desirable to provide an alternating current generator that does not need the changeover switch, can simultaneously output the alternating current electric powers of the three-phase power source and the single-phase three-wire power source, and is high in the utilization factor thereof; wherein furthermore, the winding number of the armature winding of the single-phase three-wire power source does not depend on that of the three-phase power source; wherein as a result, the output voltage from the three-phase power source to the single-phase three-wire power source can be freely set; and wherein in particular, this makes it possible to handle the overseas situations where the voltage specifications are various.

SUMMARY OF THE INVENTION

An alternating current generator, according to a first aspect of the present invention that solves the problems described above, is a generator that has a three-phase power source for outputting a three-phase alternating current electric power and a single-phase three-wire power source for outputting a single-phase alternating current electric power; wherein the three-phase power source is configured so that three armature windings, each of which is wound from a winding start end connected to a neutral point to each of winding finish ends with same winding numbers and a phase difference of 120 degrees (electric angle), is connected to the neutral point in Y-connection; wherein for two out of the three armature windings, each of two taps is provided at a predetermined position where a winding number of each of the two armature windings from the winding start end at a side of the neutral point is equal; and wherein each of two armature extension windings having a half winding number of each part of the two armature windings, where each part exists between relevant one of the two taps and the neutral point, is connected so as to electrically become a same phase as a remaining armature winding other than the two and to extend to the relevant one of the two taps; whereby each of the two armature extension windings is connected to a relevant part of the two armature windings through the relevant one of the two taps together with the neutral point.

In addition, an alternating current generator, according to a second aspect of the present invention, is a generator in accordance with the first aspect of the invention, wherein each predetermined position of the two taps is a terminal at a side of each of the winding finish ends; whereby the two armature windings become same as parts thereof, each of the two armature extension windings is connected to relevant one of the two armature windings through a relevant one of the two taps located at the terminal together with the neutral point.

Furthermore, an alternating current generator, according to a third aspect of the present invention, is a generator that has a three-phase power source for outputting a three-phase alternating current electric power and a single-phase three-wire power source for outputting a single-phase alternating current electric power; wherein the three-phase power source is configured so that three armature windings, which are wound from a winding start end connected to a neutral point to winding finish ends with the same winding numbers and a phase difference of 120 degrees, respectively, are connected to the neutral point in Y-connection; wherein for two out of the three armature windings, each of two taps is provided at each predetermined position where a winding number from the winding start end at a side of the neutral point is equal; and wherein in each of two armature extension windings having a same winding number as each part of the two armature windings, which each part exists between each of the two taps and the neutral point, one of the two armature extension windings is connected to the relevant one of the two taps so as to electrically become a reverse phase for the relevant one of the two armature windings, and the other of the two armature extension windings is connected to the relevant other of the two taps so as to electrically become the reverse phase for the relevant other of the two armature windings; whereby each of the two armature extension windings is connected to a relevant part of the two armature windings through the relevant one of the two taps together with the neutral point.

Still furthermore, an alternating current generator, according to a fourth aspect of the present invention, is a generator wherein each predetermined position of the two taps is a position that bisects a relevant one of the two armature windings, whereby each of the two armature extension windings is connected to the relevant one of the two armature windings through the relevant one of the two taps together with the neutral point.

In accordance with the present invention, outputs of the three-phase power source and the single-phase three-wire power source act so as to be simultaneously generated. As a result, this makes it unnecessary to change the three-phase power source and the single-phase three-wire power source, and the utilization factor thereof also increases.

In addition, taps can be freely set, thereby output voltages can be freely set, and in particular, this makes it easy to handle the overseas situations where the voltage specifications are various.

DESCRIPTION OF THE PREFERRED EMBODIMENTS

Figure 1:
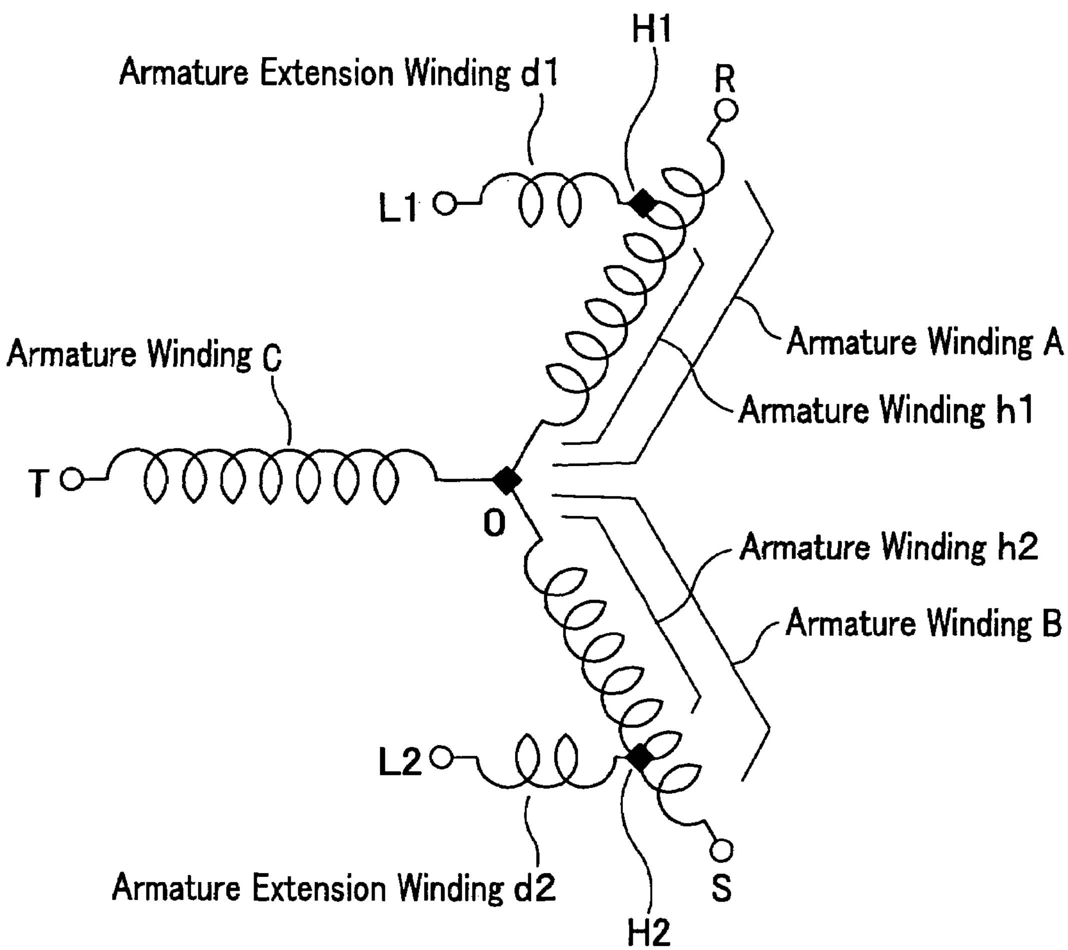
FIG. 1 is a circuit diagram of an alternating current generator related to a first embodiment of the present invention.

Hereinafter, an alternating current generator related to the embodiments of the present invention will be described in detail, referring to the drawings.

Figure 2:
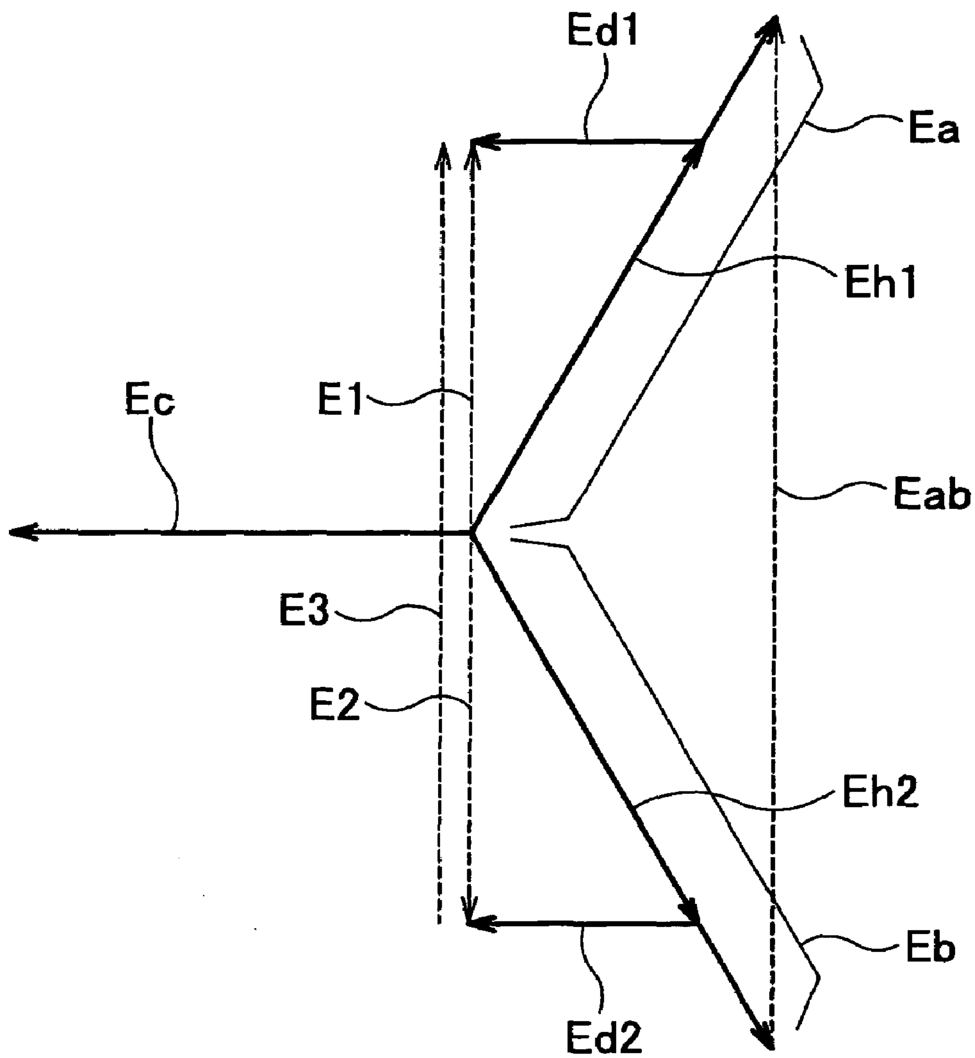
FIG. 2 is a vector diagram showing a relationship of voltages generated in each of the armature windings when the alternating current generator of FIG. 1 is driven.

FIG. 1 is a circuit diagram of an alternating current generator according to a first embodiment of the present invention, and FIG. 2 is a vector diagram showing a relationship of voltages generated in each of the armature windings when the alternating current generator of FIG. 1 is driven.

The alternating current generator of FIG. 1 has three armature windings A, B, and C, which are wound from a winding start end connected to a neutral point O to winding finish ends with the same winding numbers, and a stator that is connected to the neutral point O in Y-connection at a phase difference of 120 degrees (electric angle), respectively, and configures a three-phase power source. A grounding wire Le is connected to the neutral point O, as needed.

The alternating current generator comprises taps H1 and H2 provided at predetermined positions (in FIG. 1 intermediate points that are near the winding finish ends of the armature windings A and B, and where winding numbers of the armature windings A and B are equal) from the winding start end, that is, the neutral point O, to the winding finish ends of the armature windings A and B out of the three armature windings A, B, and C; and armature extension windings d1 and d2, one terminal of which is connected to a relevant one of the taps H1 and H2, and the other terminals of which, terminals L1 and L2, are made single-phase output terminals. The armature extension windings d1 and d2 have half the winding numbers of armature windings h1 and h2, are shown as voltage vectors Ed1 and Ed2 in FIG. 2, and are set to a same phase as the armature winding C (shown as a vector Ec in FIG. 2) in FIG. 1.

Referring to FIG. 2, when the alternating current generator is driven, three-phase voltage vectors Ea, Eb, and Ec are generated, and voltage vectors Eab shown in broken lines, Ebc (not shown), and Eca (not shown) are generated between terminals R and S, terminals S and T, and terminals T and U as composite vectors between the adjacent phases.

On the other hand, in each of the armature extension windings d1 and d2 is generated each of the voltage vectors Ed1 and Ed2 whose phases are the same as that of the voltage vector Ec. In addition, in the armature winding h1 is generated a voltage vector Eh1 whose phase is the same as that of the voltage vector Ea; and in the armature winding h2 is generated a voltage vector Eh2 whose phase is the same as that of the voltage vector Eb. As for the magnitude of each vector, the following relationship is provided: $2|Ed1|=2|Ed2|=|Eh1|=|Eh2|$.

From these vector computations it is shown that a voltage vector E1 of a composite vector of the voltage vectors Ed1 and Eh1 is equal to a voltage vector E2, and the magnitude of a vector E3 is double the magnitude of each of the voltage vectors Ed1 and Ed2. In other words, the voltage vectors E1, E2, and E3 are output from the terminals L1 and L2, and the neutral point O as single-phase alternating current electric powers of the single-phase three-wire power source.

In addition, the predetermined positions of the taps H1 and H2 can be set at predesired positions without depending on the voltage vectors Eab, Ebc (not shown), and Eca (not shown) of the armature windings of the three-phase power source.

Figure 3:
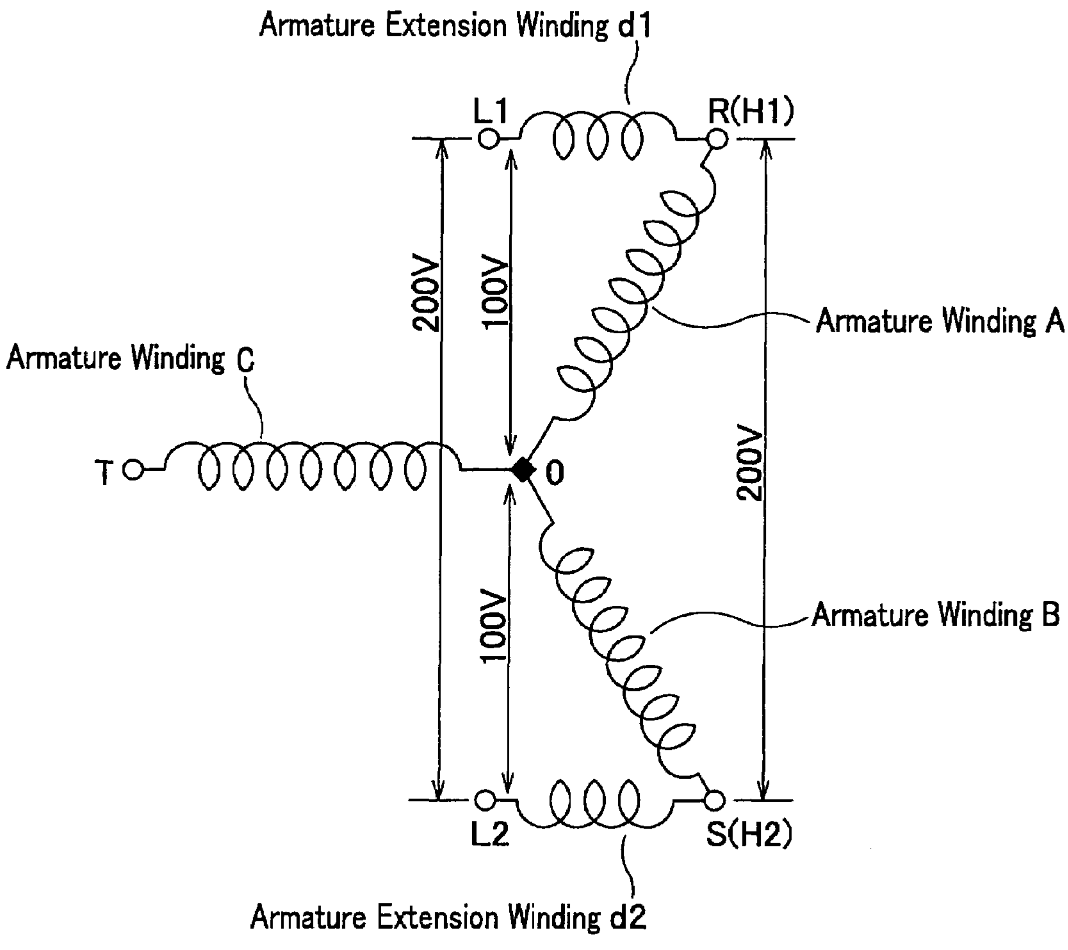
FIG. 3 is a circuit diagram of an alternating current generator related to a second embodiment of the present invention.
Figure 4:
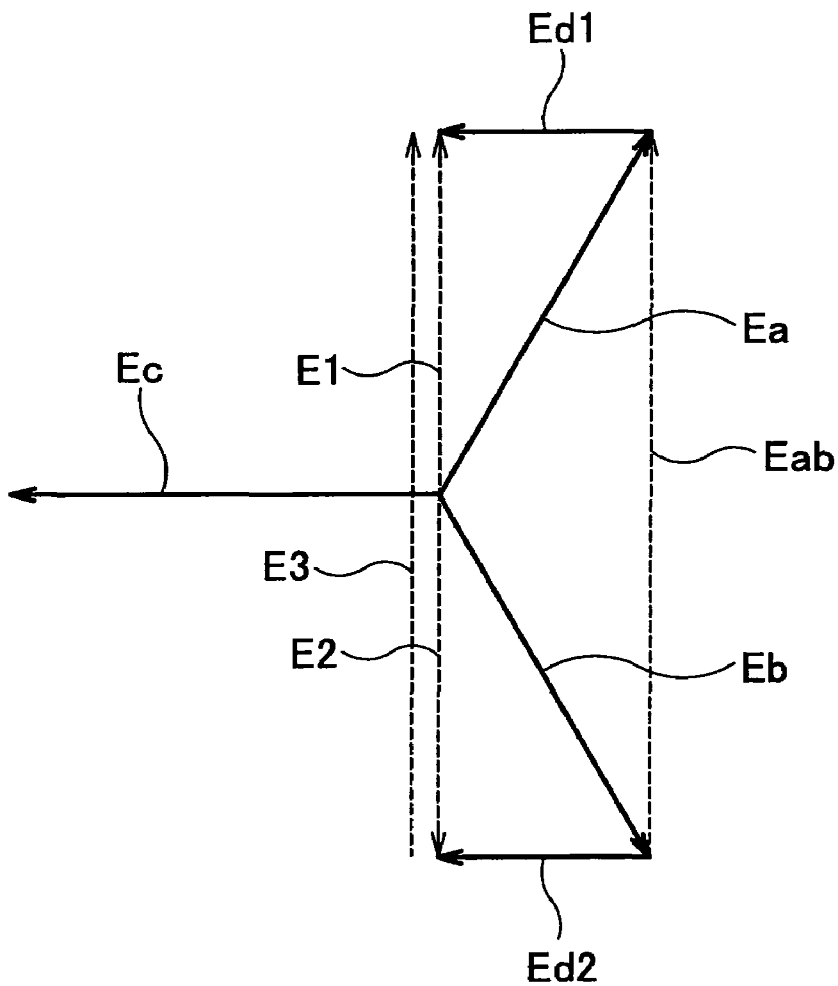
FIG. 4 is a vector diagram showing a relationship of voltages generated in each of the armature windings when the alternating current generator of FIG. 3 is driven.

FIG. 3 is a circuit diagram of an alternating current generator according to a second embodiment of the present invention. FIG. 4 is a vector diagram showing a relationship of voltages generated in each of the armature windings when the alternating current generator of FIG. 3 is driven.

The alternating current generator of FIG. 3 is characterized in that a predetermined position of the tap H1 is the same as that of the terminal R. When setting the magnitude of the voltage vector Eab of FIG. 4 to be 200 V, a three-phase alternating current electric power of 200 V each is output from the terminals R, S, and T of FIG. 3; simultaneously a single-phase alternating current electric power of 100V each is output from between the terminal L1 and the neutral point O, and between the terminal L2 and the neutral point O; and a single-phase alternating current electric power of 200V is output from between the terminals L1 and L2.

Figure 5:
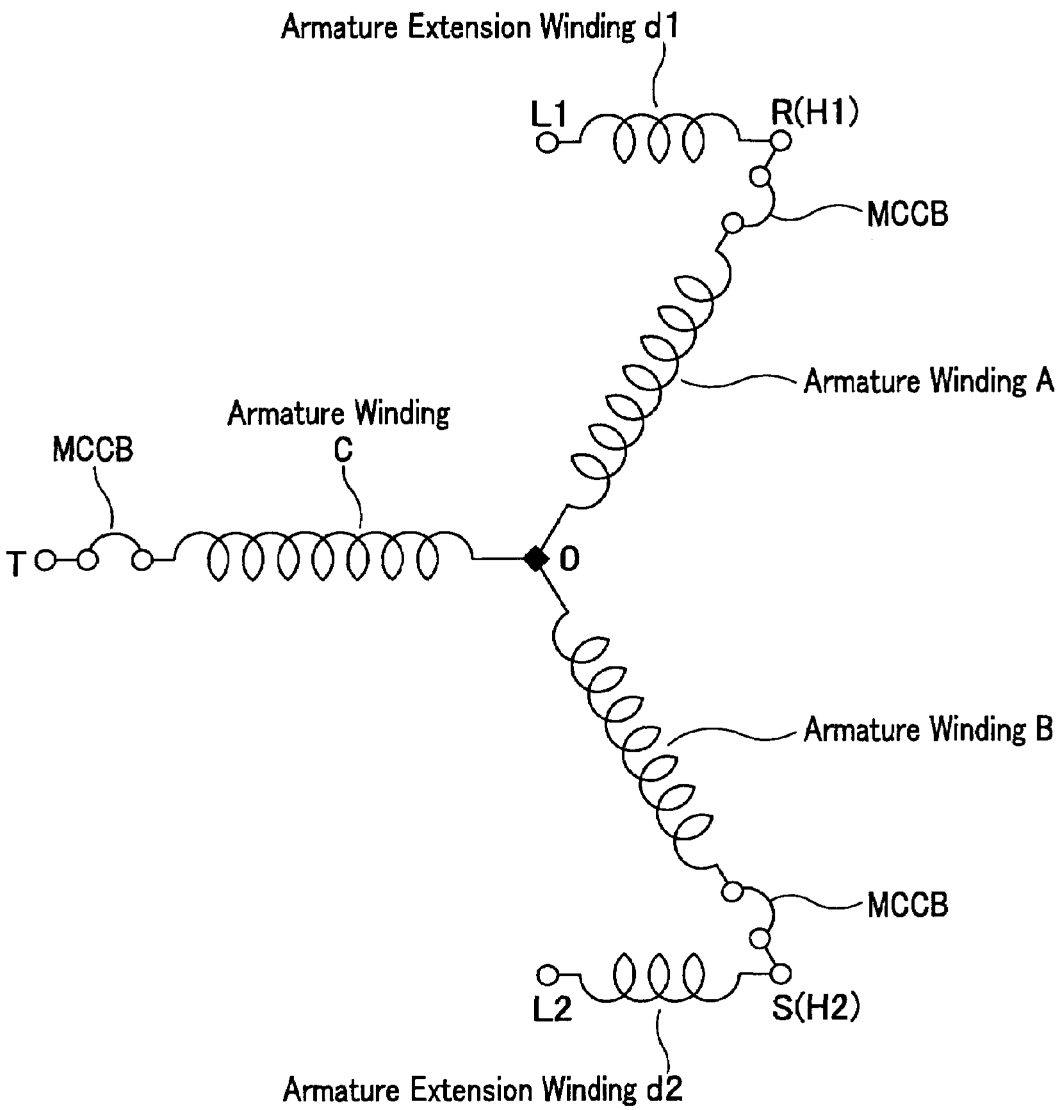
FIG. 5 is a circuit diagram of an alternating current generator related to a third embodiment of the present invention.

FIG. 5 is a circuit diagram of an alternating current generator according to a third embodiment of the present invention. This is characterized in that each MCCB (Moulded-Case Circuit Breaker) for an overcurrent protection is intervened between each of the terminals R, S, and T, and the relevant one of the armature windings A, B, and C. The MCCB is a breaker for shutting off a circuit of an electric power passage, and the voltage vectors shown in FIGS. 2 and 4 do not have any influence with respect to a presence or absence thereof. Accordingly, the MCCB can be provided at requested places within a range of conventional known technology.

This situation is the same in the embodiments described below.

Figure 6:
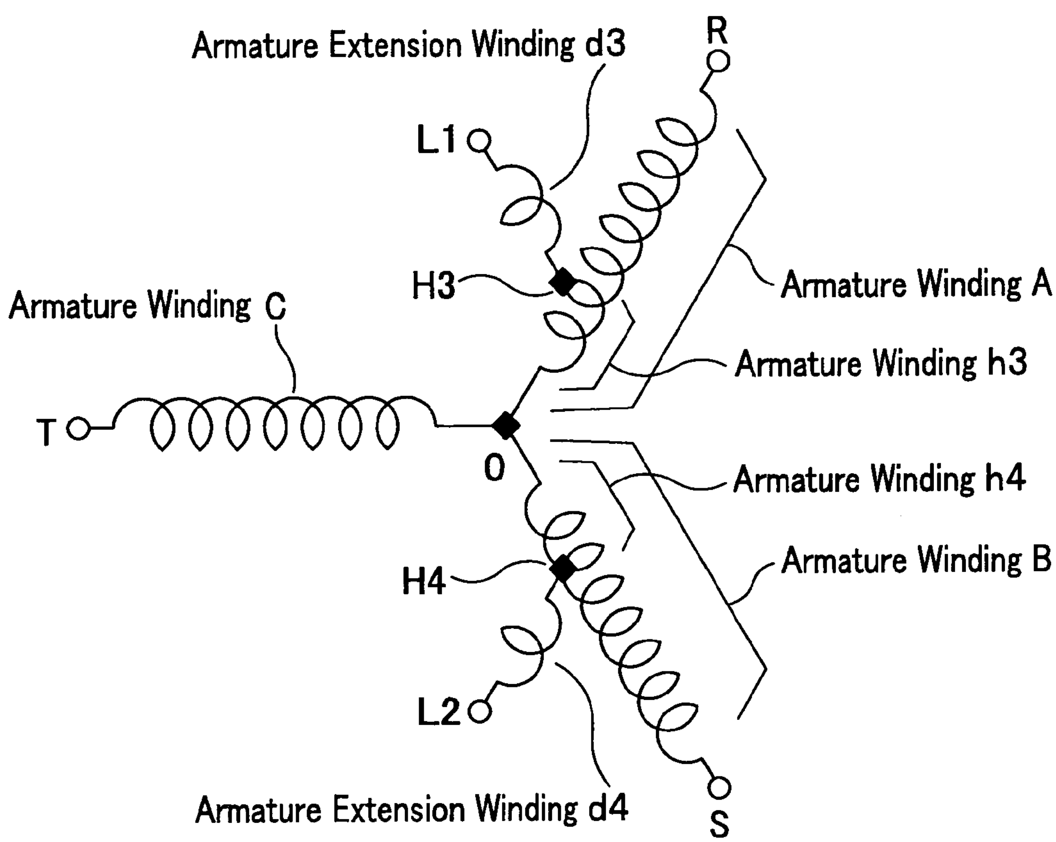
FIG. 6 is a circuit diagram of an alternating current generator related to a fourth embodiment of the present invention.
Figure 7:
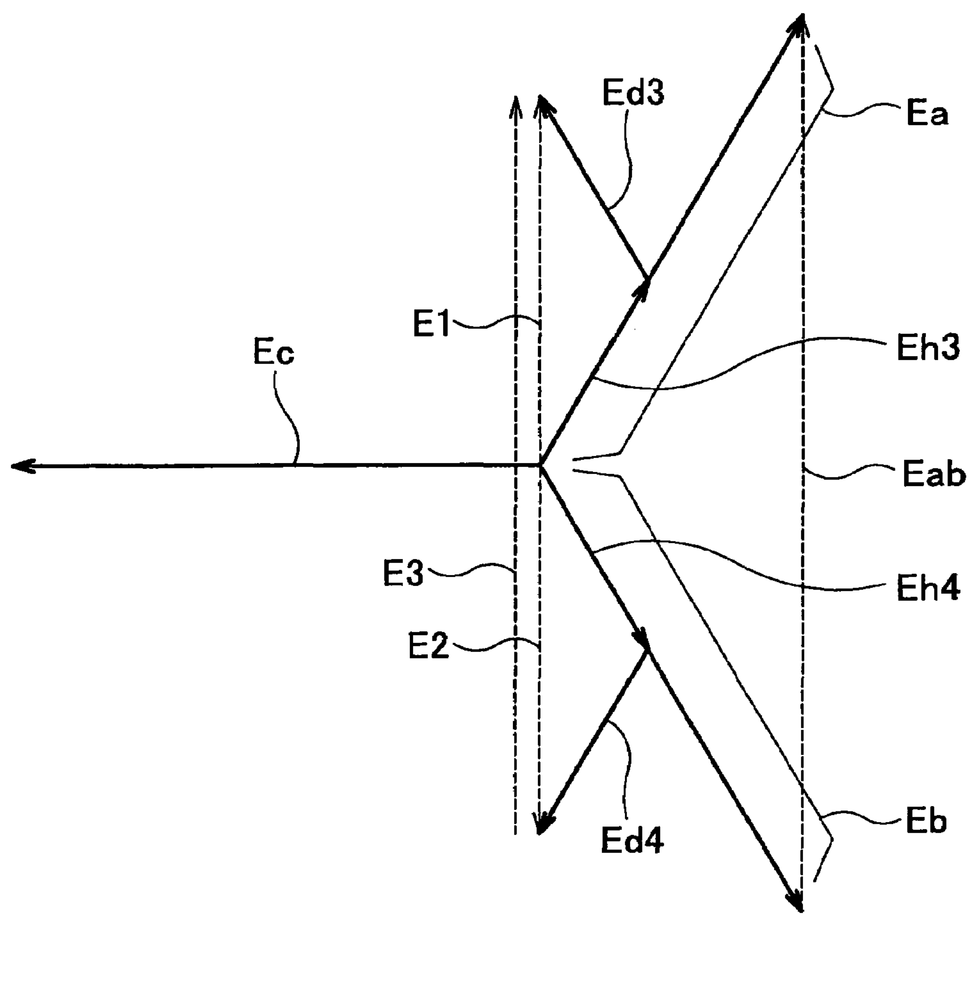
FIG. 7 is a vector diagram showing a relationship of voltages generated in each of the armature windings when the alternating current generator of FIG. 6 is driven.

FIG. 6 is a circuit diagram of an alternating current generator according to a fourth embodiment of the present invention. FIG. 7 is a vector diagram showing a relationship of voltages generated in each of the armature windings when the alternating current generator of FIG. 6 is driven.

The alternating current generator of FIG. 6 has the three armature windings A, B, and C, which are wound from a winding start end connected to the neutral point O to winding finish ends with the same winding numbers, and a stator that is connected to the neutral point O in Y-connection at a phase difference of 120 degrees, respectively, and configures the three-phase power source. The grounding wire Le is connected to the neutral point O, as needed.

The alternating current generator comprises taps H3 and H4 provided at predetermined positions (in FIG. 6 intermediate points that are near the winding start end of the armature windings A and B, and where winding numbers of the armature windings A and B are equal) from the winding start end, that is, the neutral point O, to the winding finish ends of the armature windings A and B out of the three armature windings A, B, and C; and armature extension windings d3 and d4, one terminal of which is connected to a relevant one of the taps H3 and H4, and the other terminals of which, terminals L1 and L2, are made single-phase output terminals, wherein the terminals h3 and d3 have the same winding numbers, and also have the same as those of the terminals h4 and d4. The alternating current generator is characterized in that the armature extension windings d3 and d4 are connected to the armature windings A and B in an electrically reverse phase.

Referring to FIG. 7, in the armature winding d3, a voltage vector Ed3 of the reverse phase for the voltage vector Eb is generated; in an armature winding d4, a voltage vector Ed4 of the reverse phase for the voltage vector Ea is generated. In addition, in the armature winding h3, a voltage vector Eh3 of a same phase as the voltage vector Ea is generated; in the armature winding h4, a voltage vector Eh4 of the same phase as the voltage vector Eb is generated. The magnitude of each of the vectors is provided by the following relationship: $|Ed3|=|Ed4|=|Eh3|=|Eh4|$.

From these vector computations it is shown that the voltage vector E1 of the composite vector of the voltage vectors Ed3 and Eh3 is equal to the voltage vector E2, and the magnitude of the vector E3 is double the magnitude of each of the voltage vectors Ed1 and Ed2. In other words, the voltage vectors E1, E2, and E3 are output from the terminals L1 and L2, and the neutral point O as single-phase alternating current electric powers of the single-phase three-wire power source.

In addition, by changing positions of the taps H3 and H4, the magnitude of the voltage vectors E1, E2, and E3 of the single-phase three-wire power source can be independently set at predesired values without depending on the voltage vectors Eab, Ebc (not shown), and Eca (not shown) of the three-phase power source.

Figure 8:
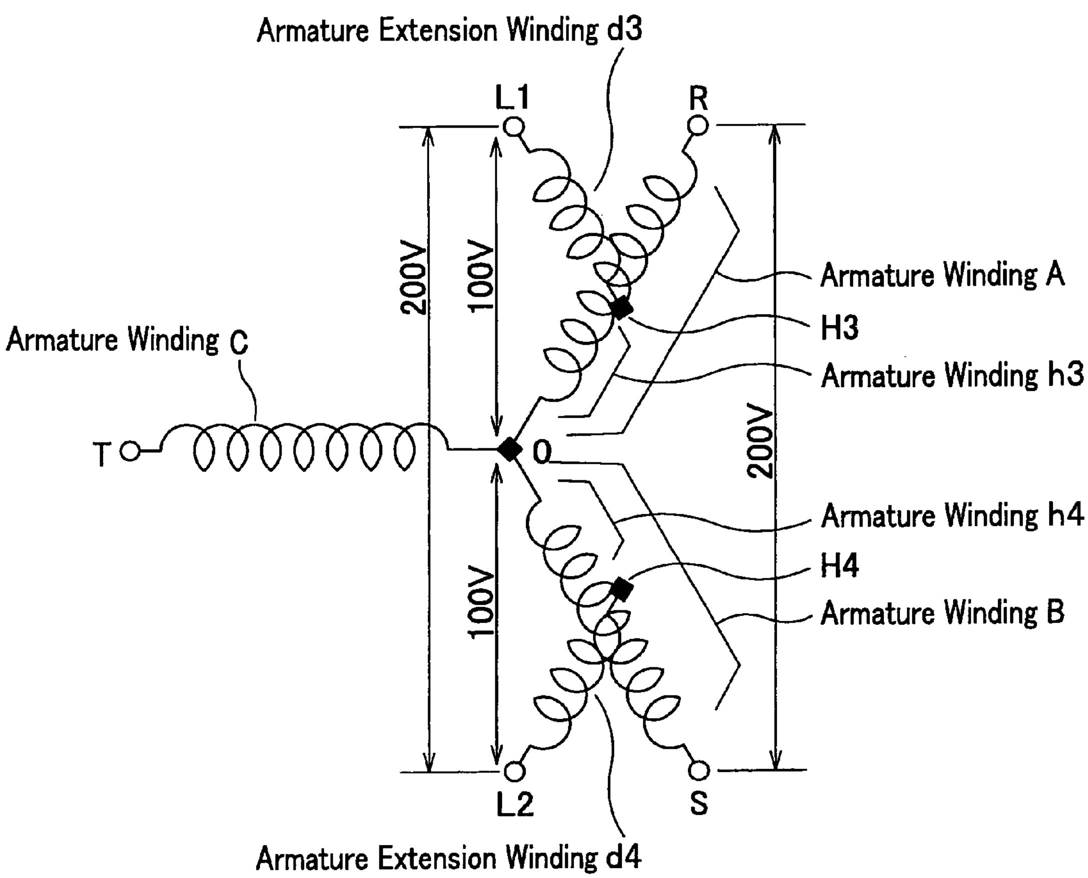
FIG. 8 is a circuit diagram of an alternating current generator related to a fifth embodiment of the present invention.
Figure 9:
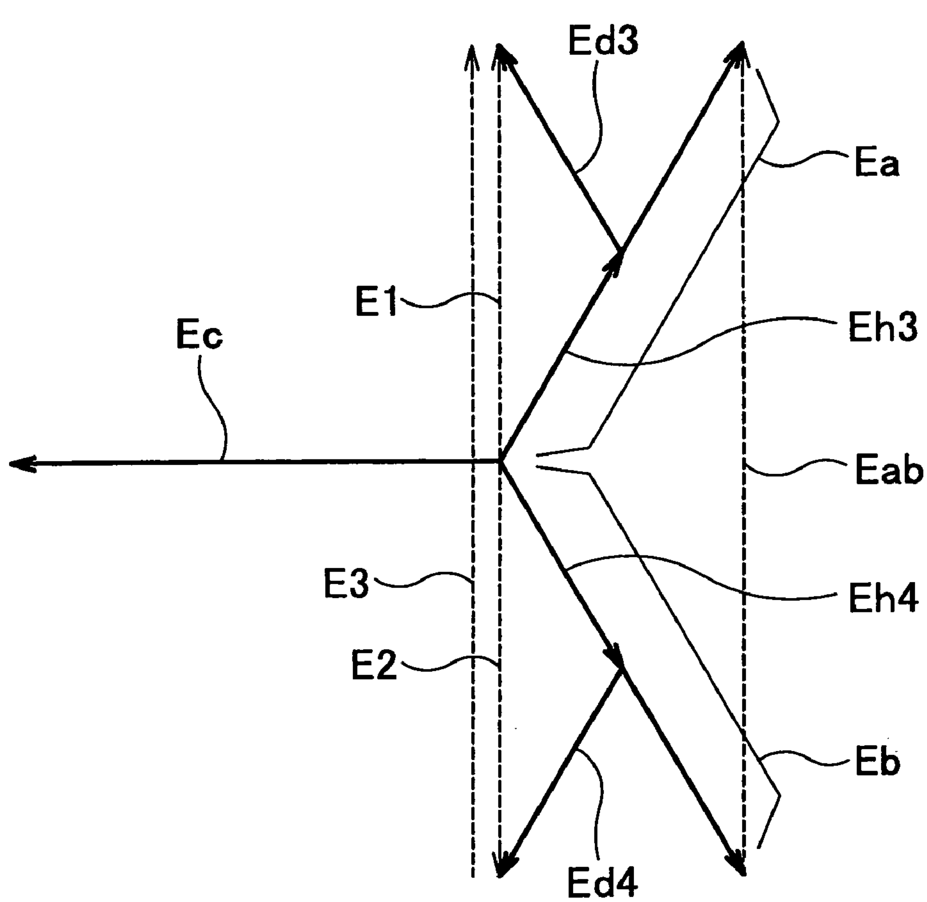
FIG. 9 is a vector diagram showing a relationship of voltages generated in each of armature windings when the alternating current generator of FIG. 8 is driven.
Figure 10:
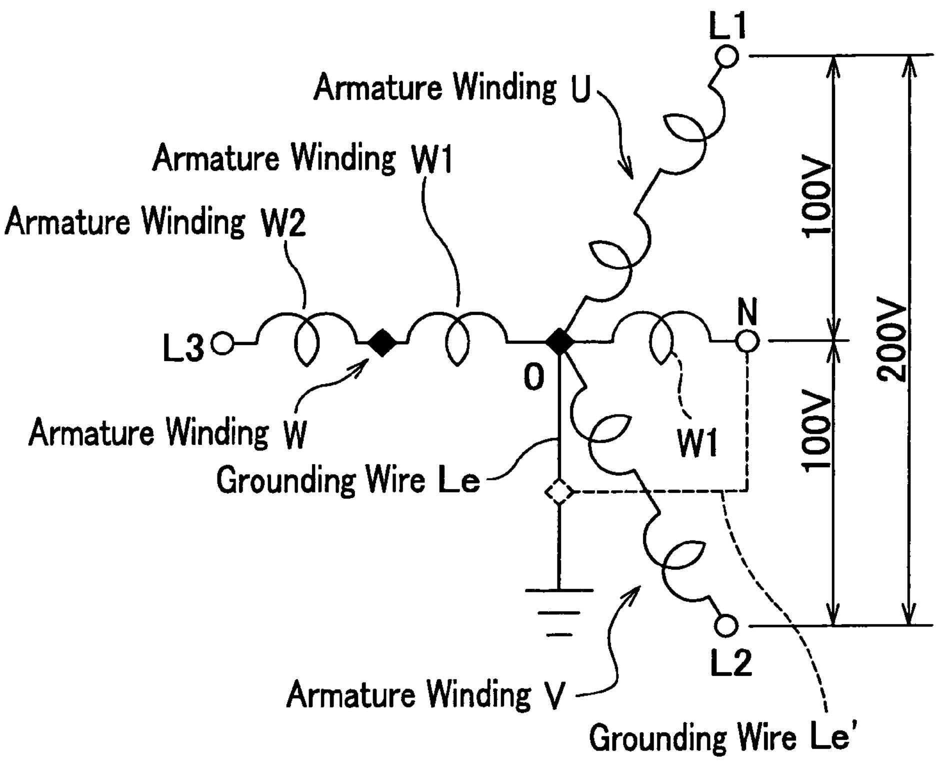
FIG. 10 is a circuit diagram of a conventional example of an alternating current generator.
Figure 11:
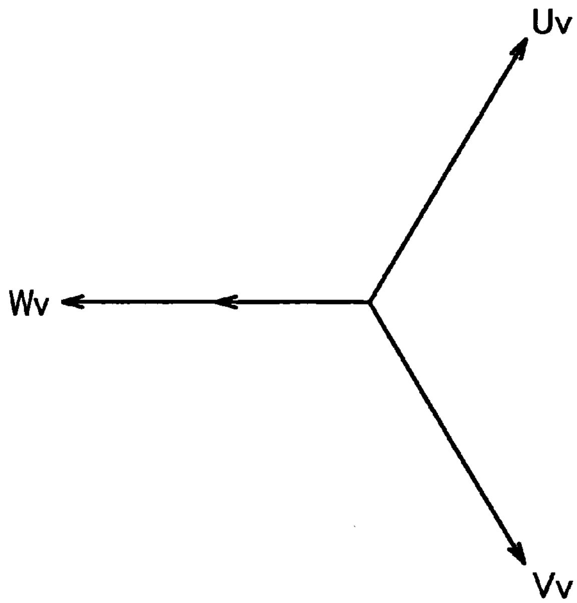
FIG. 11 is a vector diagram showing a relationship of voltages generated in each of armature windings, when in the circuit diagram of the alternating current generator of FIG. 10, W1 and W2 (two same directional (left directional) voltage vectors shown in solid lines) are connected in series and the generator is driven.
Figure 12:
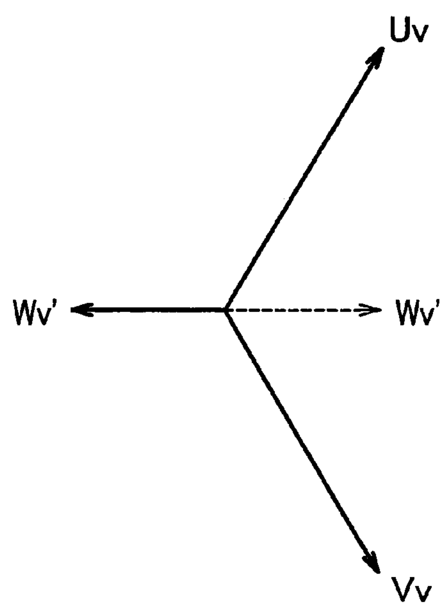
FIG. 12 is another vector diagram showing a relationship of voltages generated in each of armature windings, when in the circuit diagram of the alternating current generator of FIG. 10, nothing except for W1 is connected in the reverse phase (right directional voltage vector of broken lines) and the generator is driven.

FIG. 8 is a circuit diagram of an alternating current generator according to a fifth embodiment of the present invention. FIG. 9 is a vector diagram showing a relationship of voltages generated in each of the armature windings when the alternating current generator of FIG. 8 is driven.

FIG. 8 illustrates an example of the tap H3 of FIG. 6 being provided at a position where a winding number of the armature winding A is bisected, and the tap H4 is provided at a position where a winding number of the armature winding B is bisected. Referring to FIG. 9, when the magnitude of the voltage vectors Eab, Ebc (not shown), and Eca (not shown) between the terminals R and S, S and T, and T and R is set to 200 V, as shown in FIG. 8, a three-phase alternating current electric power of 200 V each is output from the terminals R, S, and T; simultaneously a single-phase alternating current electric power of 100 V is output from between the terminal L1 and the neutral point O, and between the terminal L2 and the neutral point O; and a single-phase alternating current electric power of 200 V is output from between the terminals L1 and L2.

Thus, although the embodiments of the present invention are described with voltage vectors of 200 V and 100 V, the invention is not limited thereto and various variations are available without departing from the spirit and scope of the invention.

For example, by providing a plurality of combinations of taps and extension windings at each predetermined position of the armature windings A, B, and C, predesired output voltages may be obtained.

What is claimed is:

1. An alternating current generator having a three-phase power source for outputting a three-phase alternating current electric power and a single-phase three-wire power source for outputting a single-phase alternating current electric power, the generator comprising:

two taps, each of which being respectively provided with any two of three armature windings at a position where each winding number of the two armature windings from a winding start end of a neutral point is equal; and two armature extension windings, each of which having a half winding number from said winding start end to said tap, and being connected so as to electrically become a same phase as a remaining armature winding other than said two armature windings and to extend to said taps, wherein said three-phase power source is configured so that the three armature windings are connected to said neutral point in Y-connection, wherein said three armature windings are wound from the winding start end connected to said neutral point to winding finish ends with same winding numbers and a phase difference of 120 degrees of an electric angle, respectively.

2. An alternating current generator according to claim 1, wherein each position of said two taps is connected to a terminal corresponding to each of said winding finish ends.

3. An alternating current generator having a three-phase power source for outputting a three-phase alternating current electric power and a single-phase three-wire power source for outputting a single-phase alternating current electric power;

two taps, each of which being respectively provided with any two of three armature windings at a position where each winding number of the two armature windings from a winding start end of a neutral point is equal; and two armature extension windings, each of which having a same winding number of from said winding start end to said tap, one of which being connected to one of said two taps so as to electrically become a reverse phase for said one of said two armature windings, and the other one of which being connected to the other one of said two taps so as to electrically become a reverse phase for the other one of said two armature windings, wherein said three-phase power source is configured so that the three armature windings, which are wound from the winding start end connected to said neutral point to winding finish ends with same winding numbers and a phase difference of 120 degrees of an electric angle are connected to the neutral point in Y-connection, respectively.

4. An alternating current generator according to claim 3, wherein each position of said two taps is connected to a position that bisects each winding number of said two armature windings.

* * * * *